United States Patent [19]

Appelblatt et al.

[11] Patent Number: 4,461,202
[45] Date of Patent: Jul. 24, 1984

[54] SIX-WHEEL ARMORED VEHICLE

[75] Inventors: Irving Appelblatt, West Bloomfield; Peter Krawiecki, Utica, both of Mich.

[73] Assignee: Ex-Cell-O Corporation, Troy, Mich.

[21] Appl. No.: 411,152

[22] Filed: Aug. 25, 1982

Related U.S. Application Data

[62] Division of Ser. No. 182,254, Aug. 28, 1980, abandoned.

[51] Int. Cl.³ .............................................. F41H 7/02
[52] U.S. Cl. ................................ 89/40 B; 180/24.08; 180/24.11
[58] Field of Search ............. 89/36 H, 40 B; 280/663, 280/666, 685, 696, 701, 724, 725; 180/24.08, 24.09, 24.11, 73 TL

[56] References Cited

U.S. PATENT DOCUMENTS 1,933,675 11/1933 Marcum ........................ 180/24.11
1,949,830 3/1934 Fageol ........................... 180/24.11

OTHER PUBLICATIONS

Martin W. Stockel, Auto Mechanics Fundamentals, 1974, p. 290.

Primary Examiner—Stephen C. Bentley
Attorney, Agent, or Firm—John C. Evans

[57] ABSTRACT

A six-wheel armored vehicle has each wheel driven by an engine mounted between the front wheels and to the side of a driver's station disposed in the beveled shaped nose of the vehicle. Terrain in front and to the sides of the vehicle may be viewed by a driver from within the vehicle by a plurality of periscopes. Alternatively, a hatch opening in a forward sloping surface of the nose immediately behind the periscopes permits the driver to raise his head out of the vehicle in order to view the terrain. A fuel storage tank is formed integral with rear portions of the vehicle's hull and comprises a plurality of interconnected fuel cells defined by double wall construction of the hull body. A fresh air inlet and deflector arrangement in the upper horizontal surface of the hull delivers fresh air forwardly to an engine compartment for cooling the engine, and warm air generated by the engine is reversed in flow direction and exhausted via a conduit through an outlet opening immediately adjacent the fresh air inlet.

1 Claim, 11 Drawing Figures

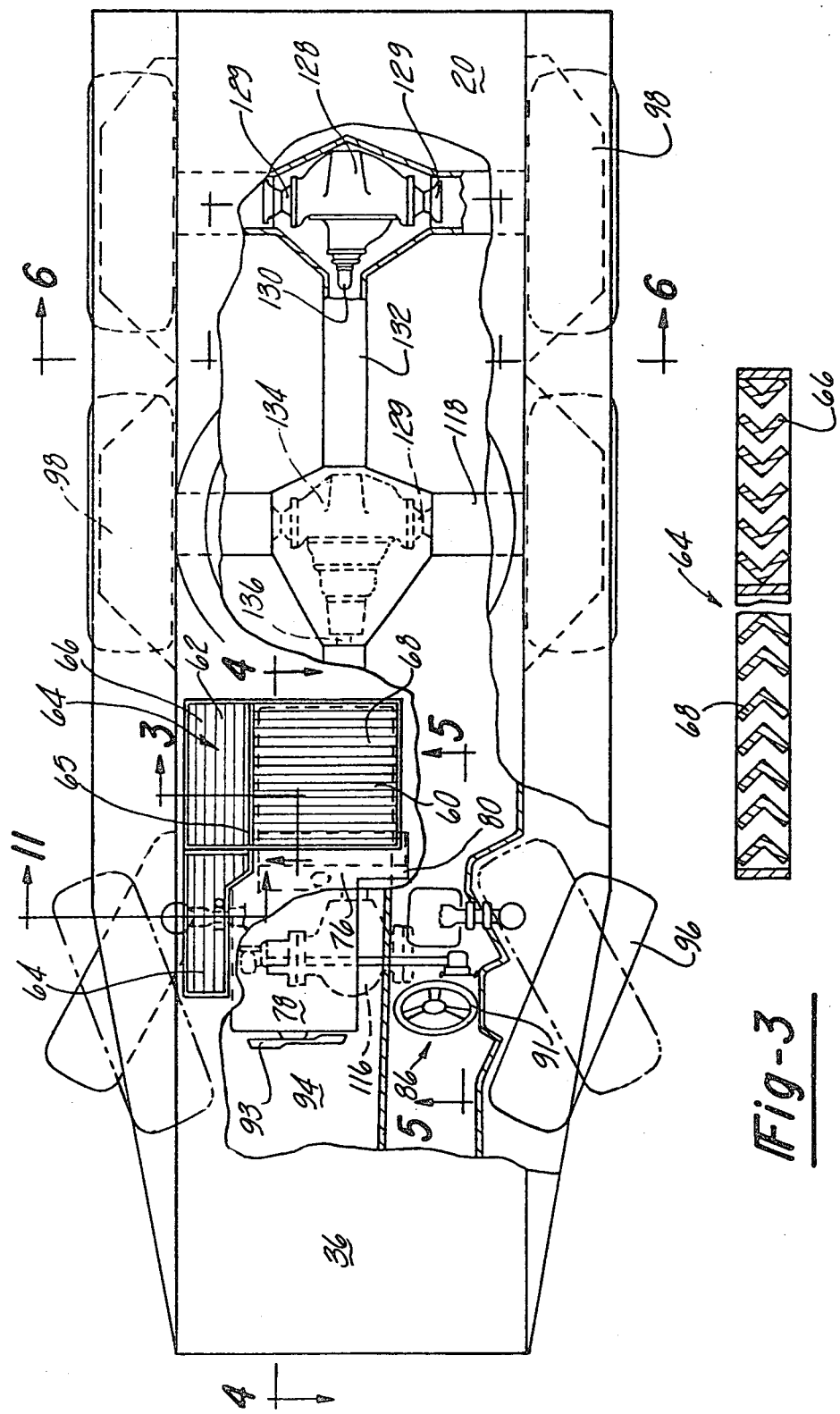

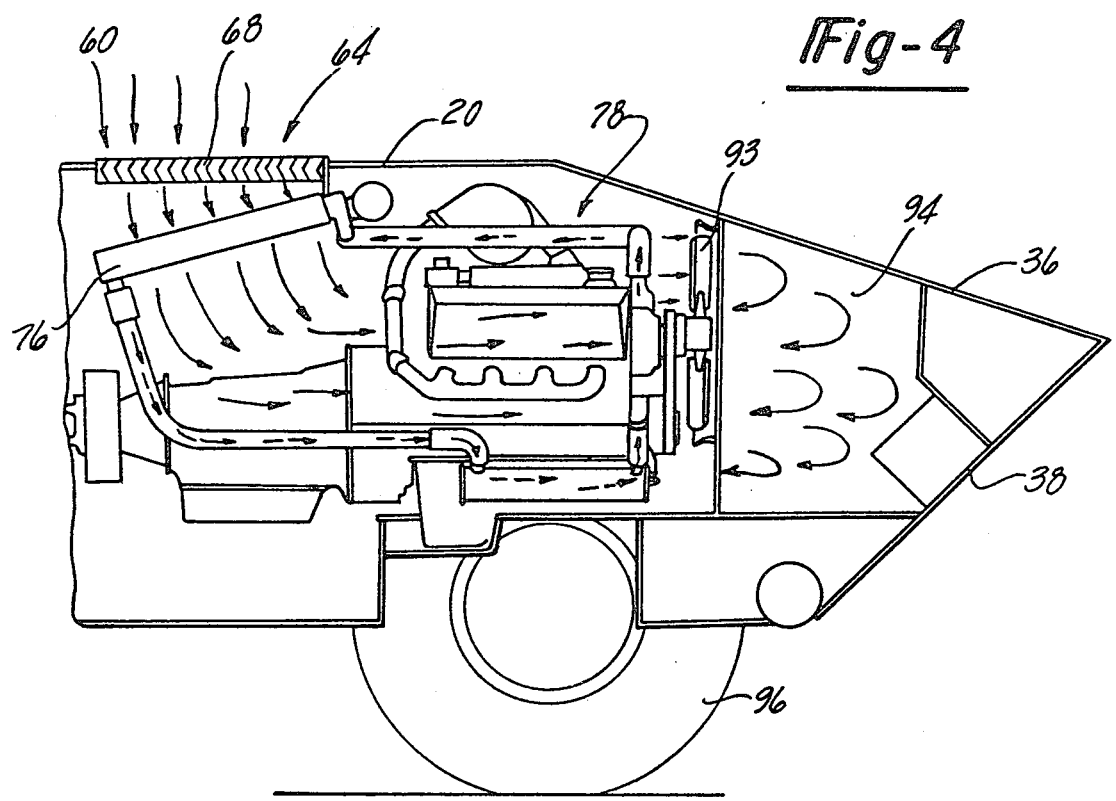
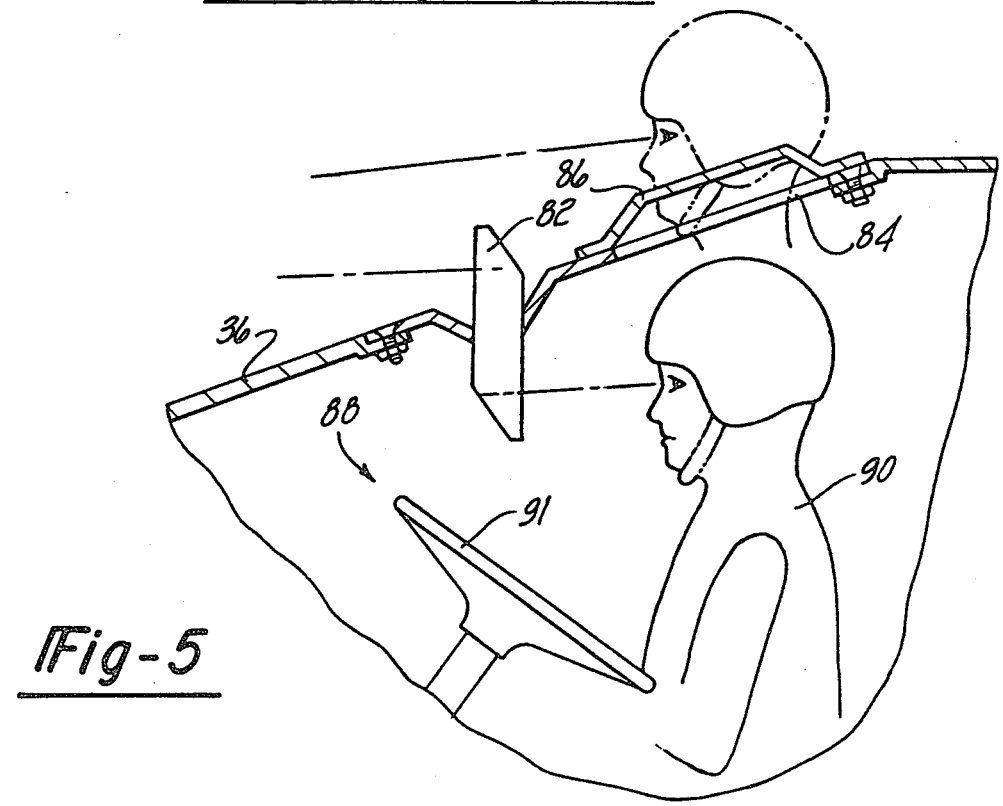

5

SIX-WHEEL ARMORED VEHICLE

This is a divisional application of U.S. Ser. No. 182,254, filed Aug. 28, 1980, now abandoned.

TECHNICAL FIELD

This invention generally relates to armored vehicles of the type employed for military or law enforcement activities, and deals more particulaly with six-wheel vehicle having an improved hull construction.

BACKGROUND ART

Armored personnel carriers of the type employing rubber tires, as distinguished from tracklaying vehicles, have been produced in several countries for many years. Such vehicles include the "MOWAG" which is manufactured in Switzerland and the "COMMANDO" which is manufactured by the Cadillac Gage Company in the United States. See "Encyclopedia of Armored Cars and Half-Tracks", published by Chartwell Books, Inc. of Secaucus, N.J., pages 120 and 130.

The "COMMANDO" is a four-wheel vehicle having a unitized hull constructed of light, high-hardness steel and displacing sufficient volume to float. Driven by its own cleated tires, the vehicle is capable of maneuvering in lakes and streams at low speeds. The engine is located to the rear of the hull and gas tanks and other equipment are located near the front.

Six-wheel type armored vehicles, also currrently manufactured in several countries, are advantageous in that an extra set of wheels disposed intermediate the front and rear wheels provide added traction, added stability and maneuverability in driving over uneven terrain and obstacles.

Previous six-wheel type armored vehicles suffer from one or more disadvantages however. For example, the extra set of wheels disposed between the front and rear wheels complicates the task of laying out the interior of the hull. The engine must be placed at a location which provides optimum height distribution on the wheels, however, the choice of engine distribution on the wheels, however, the choice of engine placement is severely limited by the overall hull design and the necessity for locating the driver in an optimum driving position, as well as the need for accommodating power plant items such as fuel tanks, cooling systems and drive trains. In the past, these objectives have been achieved only at the expense of reducing the amount of usable interior space within the hull which is devoted to transporting personnel and their equipment.

Accordingly, it is a primary object of the present invention to provide a six-wheel armored vehicle having an improved hull construction which yields a maximum volume of usable interior space while providing for optimum placement of the engine and driver's station.

Another object of the present invention is to provide a vehicle of the type mentioned above in which the nose of the hull is configured to deflect ballistic fire, but yet which exposes the steerable front wheel to water ahead of the vehicle so as to act as rudders for improving swimming maneuverability.

A still further object of the present invention is to provide a vehicle as described above in which the engine is located near the front of the hull, but yet is provided with engine cooling air inlets and air exhausts in the top of the hull and behind the engine.

A still further object of the invention is to provide an armored vehicle as described above having a fuel storage tank comprising a plurality of fuel cells formed integral with the vehicle hull at the rear of the vehicle.

These and further objects of the invention will be made clear or will become apparent during the course of the following description.

DISCLOSURE OF THE INVENTION

A swimmable six-wheel armored vehicle has each wheel thereof driven by an engine disposed forwardly and to one side within the vehicle's hull. A driver's station is positioned in the nose of the hull, laterally adjacent the engine and beneath a forwardly sloping and inwardly tapering exterior surface of the nose of the hull. A plurality of periscope viewing devices at the driver's station allows the terrain in front and to the sides of the vehicle to be viewed by a driver from within the hull, and a hatch in the area of the periscope devices permits the driver to view the terrain from outside the hull if desired. The engine cooling system is of the negative pressure type including a fresh air inlet and warm air exhaust outlet in the top of the hull which circulates air away from the engine compartment by means of an exhaust air conduit formed integral with one sidewall of the hull. A gas storage tank comprising a plurality of interconnected fuel cells is formed integral with rear sections of the hull using a double wall hull construction. Essentially the entire volume within the hull between the rear thereof and the driver's station may be utilized for transporting personnel and/or equipment.

DESCRIPTION OF THE DRAWINGS

In the drawings, which form an integral part of the specification and are to be read in conjunction therewith, and in which like components are designated by identical reference numerals in the various views:

FIG. 2 is a plan view of the vehicle of FIG. 1, parts of the hull being broken away to reveal the interior thereof;

FIG. 3 is a sectional view taken along the line 3—3 in FIG. 2;

FIG. 4 is a sectional view taken along the line 4—4 in FIG. 2;

FIG. 5 is a sectional view taken along the line 5—5 in FIG. 2;

BEST MODE FOR CARRYING OUT THE INVENTION

Figure 1:
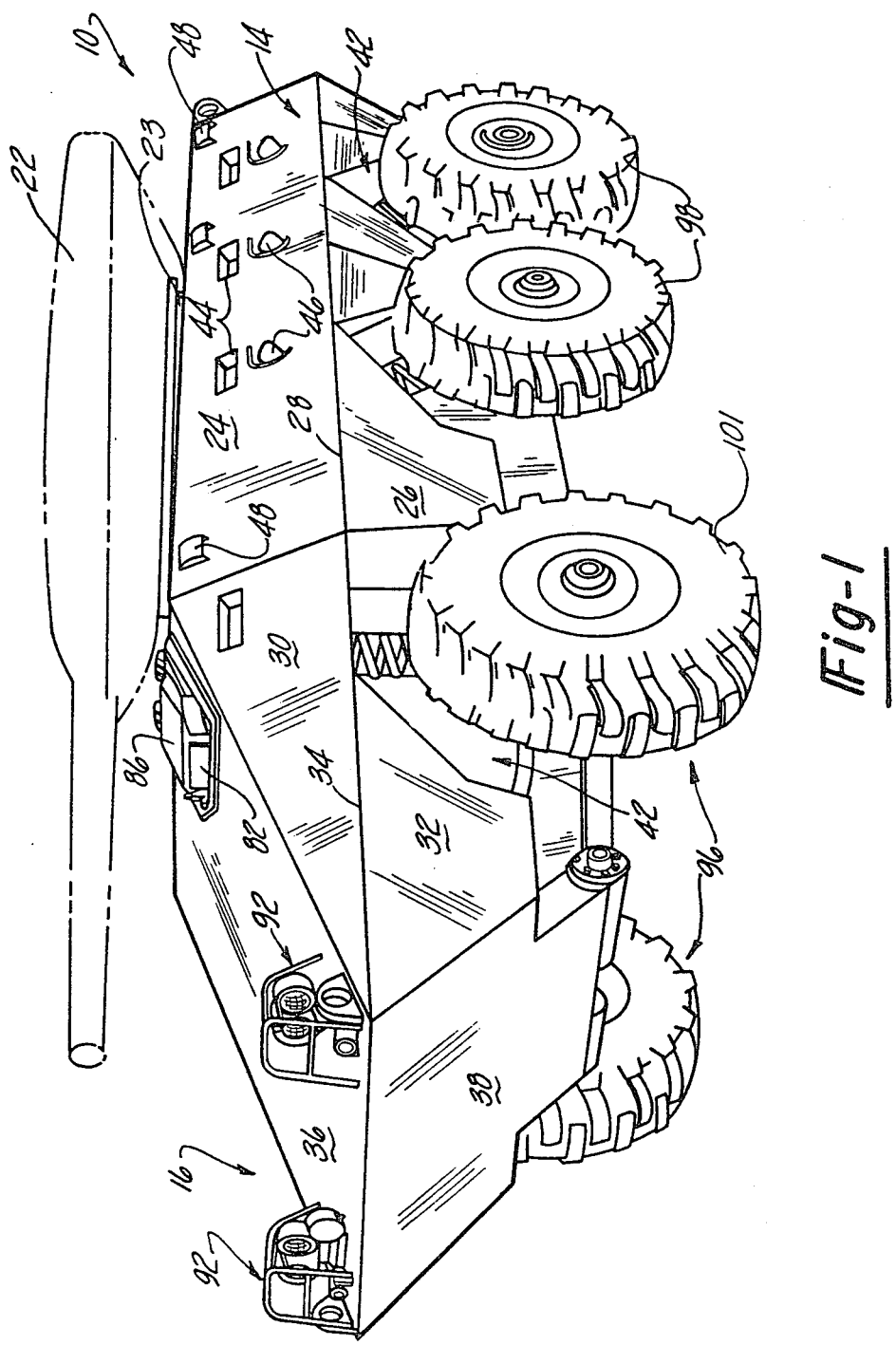
FIG. 1 is a front perspective view of the six-wheel armored vehicle which forms the preferred embodiment of the present invention.

Referring to the drawings, a swimmable six-wheel armored vehicle, generally designated by the numeral 10, includes a vehicle hull 12 defined by a pair of laterally spaced sides 14, a front end 16, a rear end 18, a horizontally extending top 22, and a bottom 20 joined together to form an enclosed interior space. The hull 12 is preferably formed of high hardness armor plates joined together by welding. Ballistic protection is provided by designing the hull 12 to present an oblique surface to small arms fire from nearly all directions, such obliquity being effective to greatly enhance the effective penetration resistance of the armor plate in all critical areas.

Each lateral side 14 includes an upper sloping surface 24 and a lower sloping surface 26 joined together along a marginal edge 28. Upper sloping surface 24 is provided with a plurality of longitudinally spaced viewing ports 44, each containing a window of thick ballistic resistant glass, a plurality of closable weapon apertures or "pistol ports" 46, and shielded vents 48. Ports 46 and vents 48 are preferably above the expected water line during swimming operations. The lower sloping sides 26 are interrupted at the belt line 28 to define front and rear wheel wells 42. As best shown in FIG. 2, the vertical surfaces of the front wheel well interiors are inwardly sloping to allow clearance for the turning wheels whereas the rear well interiors are substantially flat. All other surfaces of lower sides 26 are substantially inwardly sloped for ballistic resistance and protection of the occupants of the vehicle.

As indicated previously, the top 22 of the hull 12 is flat and extends essentially horizontal. Although forming no part of the present invention, a gun turret 22 may be mounted on a rotatable turret base 23 on the top 22 if desired. As will be understood by those skilled in the art, a basket depends from the turret into the central portion of hull 12. The front 16 of the hull 12 includes a unique beveled nose defined by a long upper sloping surface 36 and a lower sloping surface 38, both of which are quite oblique to a vertical plane; i.e., surface 36 is about 70° from vertical and surface 38 is about 45° from vertical. The front end 16 further includes a pair of inwardly tapering sides defined by an upper, triangularly shaped sloping surface 30 and a lower sloping surface 32 joined along welded joint 34. This extreme wedge shape for the nose of vehicle 10 creates several advantages. First, outstanding ballistic protection to ground level small arms fire, especially in the area of the driver. Second, the ability for the vehicle to "cam" itself over vertical obstacles such as dirt banks and walls. Third, a streamlined shape for improved speed due to reduced drag in both air and water. Fourth, improved steering capability in water due to the exposure of front wheels which can act as rudders or deflectors.

A pair of transversely spaced, protectively enclosed headlight assemblies 92 are secured to the forward of sloping surface 36. The front end 16 is further provided with a driver's hatch 86 in one upper corner of the sloping surface 36.

Figure 7:
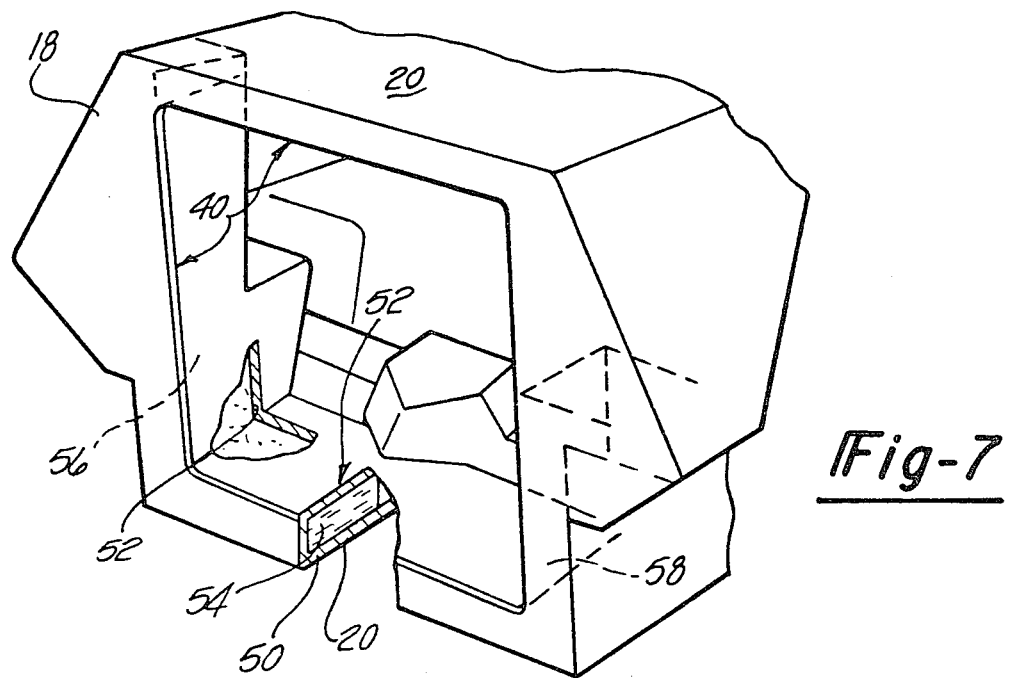
FIG. 7 is a fragmentary, rear perspective view of the vehicle shown in FIG. 1.
Figure 8:
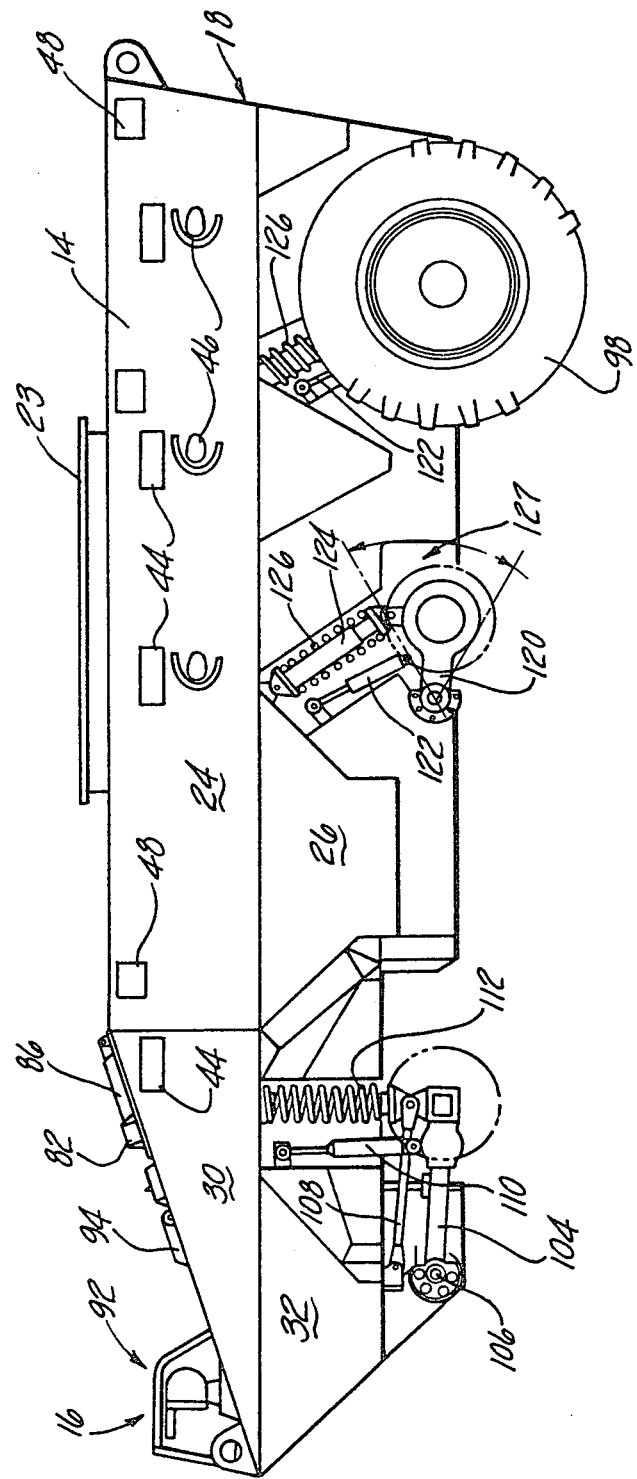
FIG. 8 is a side elevational view of the vehicle of FIG. 1, certain wheel and suspension components thereof having been removed for purposes of clarity.

As best seen in FIGS. 7 and 8, the rear end 18 of the hull 12 slopes downwardly and forwardly to form an overhang, and includes a door opening 40 which may be closed by a hinged, double panel door (not shown) mounted on hull 12. Rear portions of the lateral sides 14 and bottom 20 defining the door opening 40 are of a double wall construction and include an outer, armored wall 50, and an inner wall 52 spaced from the outer wall 50 to define a plurality of fuel storage cells 54, 56 and 58 respectively disposed in the lateral sides 14 and bottom 20 of the hull 12. The fuel storage cells 54, 56 and 58 are interconnected with each other and with a later discussed engine 78 via a fuel delivery line (not shown). Cells 54, 56 and 58 may be lined if desired.

As shown in FIG. 2, the vehicle 10 includes an engine 78 disposed forward of the longitudinal midpoint of the hull 12 and to one side of the longitudinal center line of the hull 12, between the front wheel assemblies 96. Engine 78 has an output shaft coupled through a conventional transmission to a transfer case 80. Transfer case 80 is coupled via an enclosed drive shaft 136 to a mid-axle differential 134 of the "drive-through" type, which in turn is coupled by a drive shaft 130 surrounded by a housing 132 to another differential 128. Each of the differentials 128 and 134 have a drive output connected by U-joints 129 to drive axles (not shown) enclosed within protective sleeves 118. Transfer case 80 also has an output shaft connected with a forward differential 116 for driving front wheel assemblies 96. Means for selectively disengaging the front axle drive and the rear axle drive may be provided as desired.

Engine 78 is substantially totally within the low, sloping nose area, leaving the large volume of the hull for other uses. The engine area may be partitioned from the driver's station 86 and other interior areas of the hull 12, if desired, to form a segregated engine compartment. A system for cooling the engine 12 includes a heat exchanging radiator 76 of the conventional design and an air circulation system which comprises a fresh air inlet opening 60 in the top 20 of the hull 12, a warm air exhaust opening 62 in the top 20 laterally adjacent opening 60 and conduit 70 which communicates with warm air exhaust opening 62 and extends longitudinally forward to, and communicates with, an exhaust air reversing chamber 94 defined within the front end 16. Chamber 94 is disposed immediately forward of engine 78. Radiator 76 is mounted in an attitude inclined from the horizontal and immediately beneath fresh air inlet opening 60 and behind engine 12. Thus, cool outside air flowing through inlet opening 60 passes through radiator 76 and forwardly past the engine 78 into chamber 94 as a result of a partial vacuum (negative pressure) created in the engine compartment by fan 93. Chamber 94 allows the warm exhaust air to turn 180° for delivery rearwardly through exhaust air conduit 70 to the exhaust opening 62.

Exhaust air conduit 70 is formed integral with one lateral side 14 of the hull 12. More particularly, exhaust air conduit 70 is formed by the interior surface of the upper sloping surface 24, an inner wall 72 spaced from sloping surface 24, a longitudinally extending bottom wall 74 and the upper sloping surface 36 of the front end 16. A rectangularly shaped, louvered grill 64 having a longitudinally extending partition 65 is secured to the top 20 in overlaying relationship to the openings 60 and 62. Grill 64 includes a first plurality of longitudinally extending, generally L-shaped, spaced deflection members 66 disposed over the exhaust opening 62 in order to direct warm exhaust air laterally away from inlet opening 60 as such air emanates from the top 20 of the hull 12. The grill 64 further includes another set of transversely extending, parallel, L-shaped deflection members 68 on the inward side of partition 65 which are disposed in overlying relationship to the fresh air opening 60. Deflection members 68 are oriented in a manner to act as scoops for drawing fresh air flowing over the top 20 of the hull 12 into the fresh air opening 60 for delivery past the radiator 76 and engine 78. Both sets of deflection members 66 and 68 are constructed of ballistic resistant material and are appropriately spaced apart so as to deflect ballistic projectiles directed toward the corresponding inlet and outlet openings 60 and 62 respectively, thereby preventing ballistic penetration.

Assuming that the engine compartment is partitioned off from the remaining interior of the vehicle, a hatch (not shown) may be installed in a partition wall of the engine compartment to place the engine compartment in air flow communication with the remaining area of the vehicle interior. In the event that the vehicle interior becomes filled with smoke or gas, opening out of the hatch will result in smoke or gas being drawn out of the vehicle by the negative pressure effect of the engine ventilation system.

As shown in FIG. 5, a driver 90 positioned at the driver's station 86 may view the terrain forward and to the immediate sides of the vehicle 10 from a protective position within the hull 12 using any of the periscope viewing devices 82 which are positioned to provide peripheral as well as forward viewing. As indicated previously, the driver may also gain a view of the terrain immediately ahead by raising his head through the hatch opening 84 after opening the hatch door 86 which is pivotally connected to the upper sloping surface 36. A two-position (high-low) seat mounted is used for this purpose.

Figure 6:
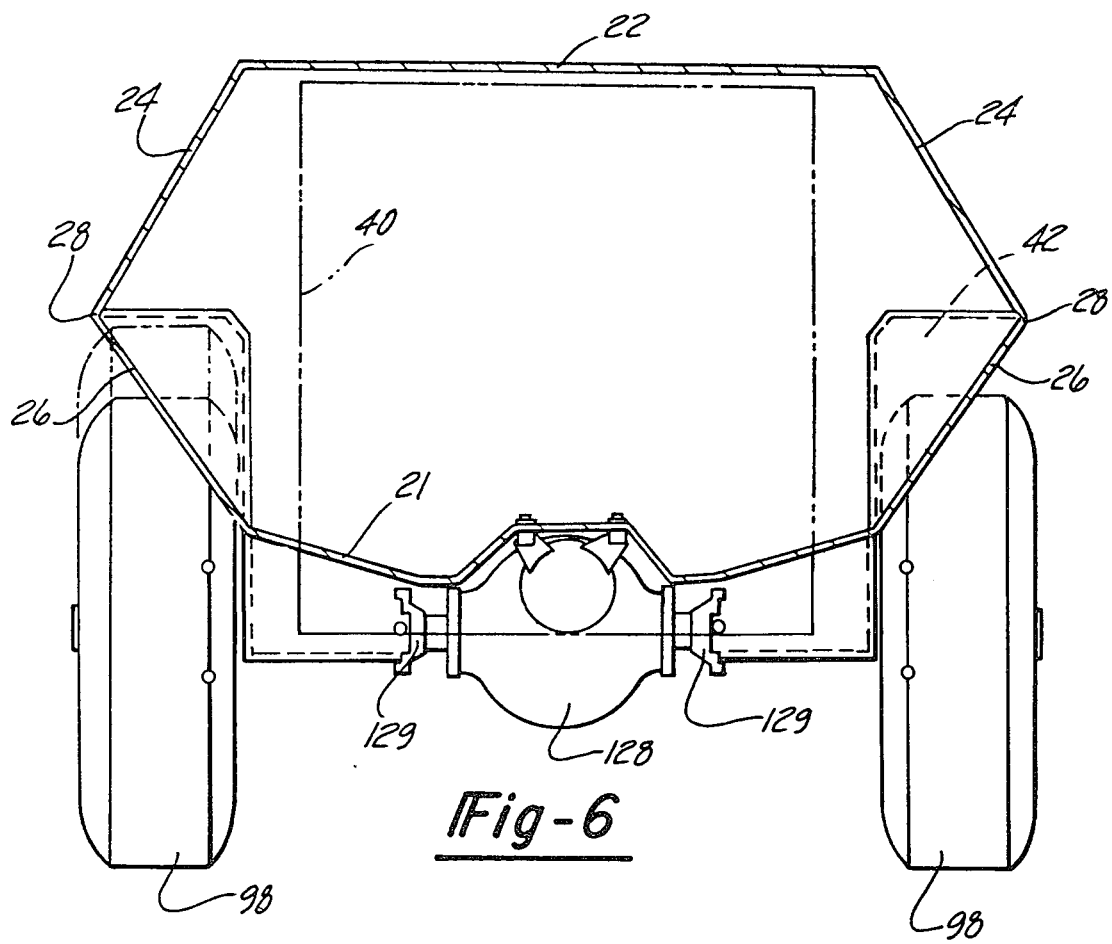
FIG. 6 is a sectional view taken along the line 6—6 in FIG. 2.
Figure 9:
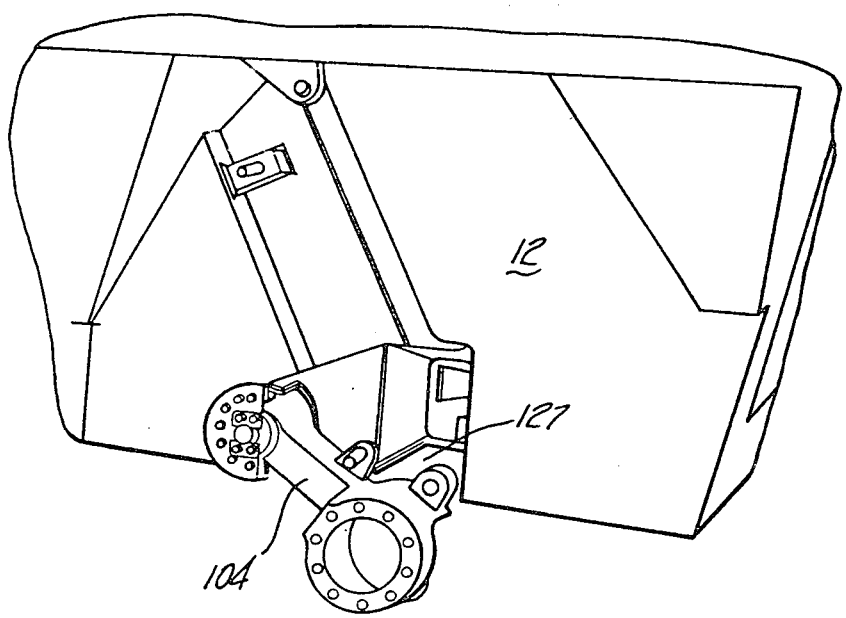
FIG. 9 is a fragmentary, perspective view of certain components of the suspension system for the rear wheels of the vehicle shown in FIG. 1, the remaining components having been removed.
Figure 10:
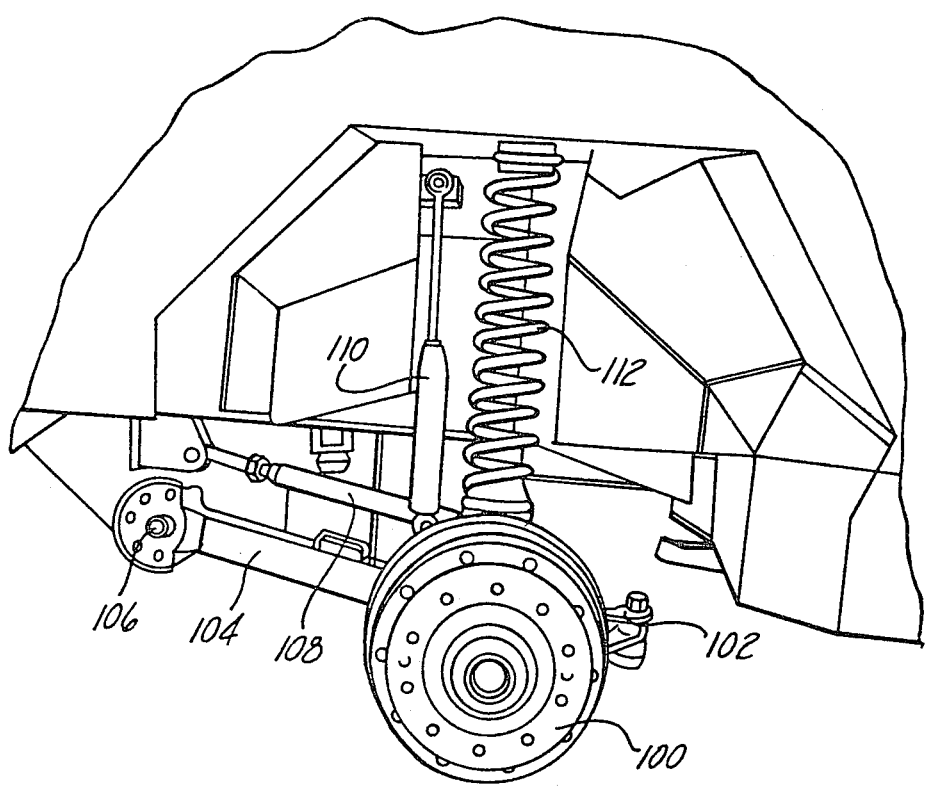
FIG. 10 is a fragmentary, perspective view of the suspension system for one of the front wheels of the vehicle shown in FIG. 1; and, FIG. 11 is a sectional view taken along the line 11—11 in FIG. 2.
Figure 11:
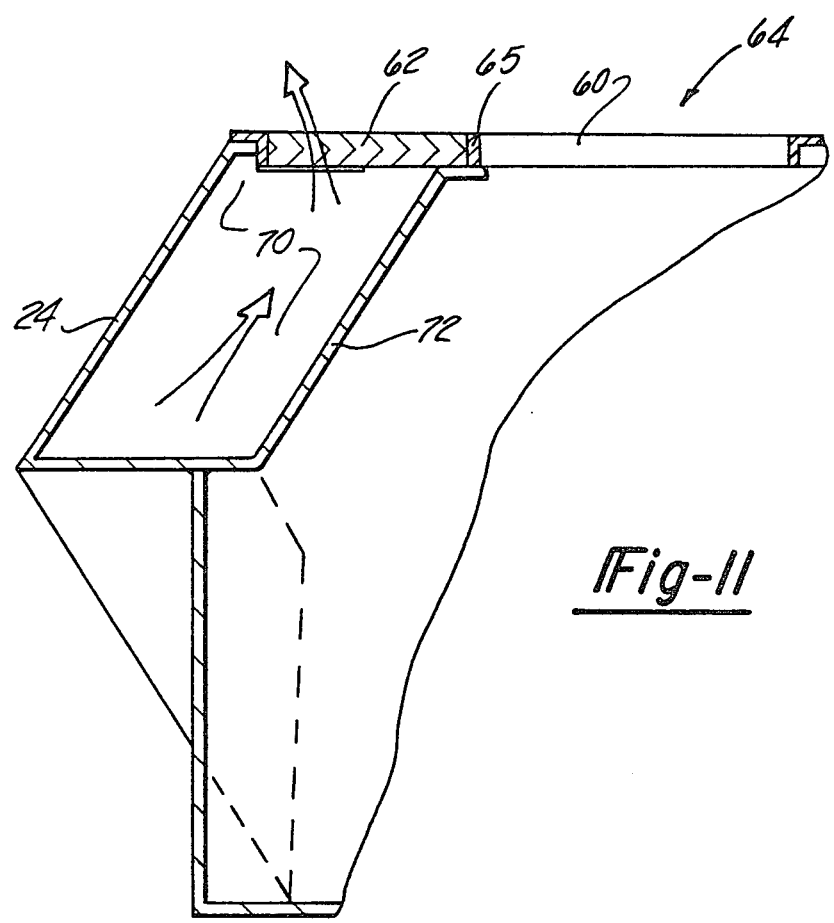

The vehicle 10 includes two pairs of spaced rear wheel assemblies 98 each positioned to the rear of the engine 78 and driver's station 86. Each of the wheel assemblies 98 includes a self-cleaning, run-flat tire 99 carried on a hub 100 driven by axles (not shown) connected to the previously mentioned U-joints 129. Each of the axle sleeves 118 is carried by one end of a trailing swing arm 120, the opposite end of swing arm 120 being pivotally connected to the hull 12 at a location forward of the corresponding axle. A stabilizer 122 has the opposite extremities thereof pivotally connected to a swing arm 120 and the hull 12. A shock absorber 124 has a suspension spring 126 sleeved therearound and has the opposite extremities thereof respectively pivotally connected to the hull 12 and swing arm 120. As best seen in FIGS. 8 and 9, the hull 12 includes a transversely extending clearance area 127 therein to allow pivotal motion of the wheel axles on the corresponding wheel assemblies 98 within the wheel wells 42, as is diagrammatically shown in FIG. 6.

The vehicle 10 is further provided with a pair of driven, steerable front wheel assemblies 96, each comprising a self-cleaning, run-flat type tire 101 removably secured to a rotatable wheel hub 100. Wheel hub 100 is mounted on a conventional steering knuckle (not shown), with the steering knuckles of each wheel assembly 96 being connected by a tie rod 102 which is controlled by steering wheel 90 at the driver's station 86. Each of the wheel hubs 100 is further connected by universal joints (not shown) and drive axles (not shown) to the differential 116. The front wheel assemblies 96 are rotatably mounted on one end of swing arms 104, the opposite end of swing arms 104 being connected for swinging movement to the hull 12 by pivotal connection 106. A stabilizer member 108 has the opposite ends thereof respectively pivotally connected to a wheel assembly 96 and the hull 12. An extensible type shock absorber 110 and suspension spring 112 each extend perpendicularly between the hull 12 and wheel assembly 96 and have the opposite ends thereof respectively connected to hull 12 and wheel assembly 96. In contrast, shock absorbers 124 and suspension springs 126 associated with rear wheel assemblies 98 extend obliquely from the corresponding wheel assemblies in a direction toward the front end 16 of the vehicle 10.

The hull design of the vehicle 10 provides highly efficient utilization of interior space and is therefore well adapted for use in many military and law enforcement applications. For example, the broad expanses of uninterrupted space within the hull 12 permits the vehicle to be used as a command station or for transporting troops. In contrast to many prior types of armored vehicles in which cool air intakes are disposed in the front of the vehicle, similar to conventional automobiles, the cool air intake, as well as the warm air exhaust for the engine cooling system, is disposed to the rear of the front end and in a horizontal top surface of the vehicle; in this manner, debris, mud, water, etc. directed toward the front of the vehicle are not apt to enter either of the cooling system openings. Moreover, openings are not present in the front or side of the vehicle which make the hull highly vulnerable to ballistic penetration. The fuel storage cells formed integral with the double-walled hull at the rear end of the vehicle not only provide for effective space utilization but isolate the fuel from the engine and from the front of the vehicle which is most apt to receive ballistic fire.

From the foregoing, it is apparent that the six-wheel armored vehicle described above not only provides for the reliable accomplishment of the objects of the invention, but does so in a particularly effective and reliable manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

We claim:

1. A multi-axle armored vehicle comprising: a unitized hull constructed from armor plate and exhibiting ballistically-resistant, oblique surfaces over substantially the entirety thereof, said hull comprising a box-like personnel-carrying body portion and an integral, forwardly, inwardly tapering wedge-shape nose portion;

front axle means in the area of the nose portion and first and second parallel rear axle means in the area of the body portion;

suspension means mounting said front axle means to said hull;

each of said first and second parallel rear axle means having a power transfer differential, a drive shaft, and a pair of drive axles, housing means for said differentials, said drive shafts and said drive axles including first and second pairs of axle sleeves, said first and second pairs of axle sleeves each having a pair of outboard ends, suspension means including a pair of trailing swing arms on each side of the hull, each of said trailing swing arms connected at one end to one of the outboard ends of one of said axle sleeves, means for pivotally connecting the opposite end of each of said trailing swing arms to said hull for swinging movement in a vertical plane, spring means for suspending the hull on each of said trailing swing arms, vehicle wheels connected to each of said trailing swing arms for concurrent vertical planar movement whereby wheel suspension movements are maintained in a limited transverse space outboard of the vehicle hull;

said spring means including a first pair of telescoping shock absorbers (124) and a coil spring (126) surrounding each of said shock absorbers having its opposite ends supported by opposite ends of said shock absorbers, said opposite ends of said shock absorbers being connected at axially offset and vertically spaced points on said hull and said trailing arm whereby said shock absorbers and coil springs extend obliquely from said wheel assemblies toward said front end to reduce the vertical height of the wheel well occupied by said spring means;

an engine selectively drivingly connected to said drive shafts for powering said vehicle, said engine being disposed substantially within the nose of said hull and laterally from a longitudinal center line of said hull; and, a driver's station spaced laterally from said engine and within the nose of said hull, said hull is provided with a plurality of wheel wells therein above said vehicle wheels having a transverse width slightly wider than the treat width of each vehicle wheel, and (1) each of said trailing swing arms being transversely spaced and having the opposite ends thereof pivotally connected to said hull at a location forward of the hull position of the axle sleeve connected thereto, (2) a second pair of telescoping shock absorbers each having one end thereof pivotally connected to the front axle means, the opposite end thereof being pivotally connected to said hull at a location substantially vertically aligned above said one end thereof such that the longitudinal axis of each of said second pair of shock absorbers extends substantially vertically, (3) each of said first pair of telescoping shock absorbers (124) each having one end thereof pivotally connected to the axle sleeves associated with said rear set of vehicle wheel means, the opposite end of each of said last named shock absorbers being pivotally connected to said hull at a location above the associated axle sleeves and forward of the hull position of the axle sleeve connected thereto.

(4) and a stabilizer member (122) associated with each of said first pair of shock absorbers (124) having opposite end thereof pivotally connected to said hull at a location below said last mentioned pivotally connected hull location whereby said stabilizer member has its longitudinal axis generally parallel to the longitudinal axis of said shock absorber 124 to efficiently utilize wheel well space occupied by the spring means at the rear set of vehicle wheel means.

* * * * *